(12) United States Patent
Neudorf

(10) Patent No.: US 7,814,735 B2
(45) Date of Patent: Oct. 19, 2010

(54) BOLT FOR ATTACHING A ROTARY MOWER BLADE

(75) Inventor: Blake Neudorf, Vonda (CA)

(73) Assignee: Highline Manufacturing Ltd., Vonda, Saskatchewan (CA)

( * ) Notice: Subject to any disclaimer, the term of this patent is extended or adjusted under 35 U.S.C. 154(b) by 104 days.

(21) Appl. No.: 12/021,980

(22) Filed: Jan. 29, 2008

(65) Prior Publication Data
US 2009/0191024 A1 Jul. 30, 2009

(30) Foreign Application Priority Data
Dec. 19, 2007 (CA) ................................ 2615304

(51) Int. Cl.
*A01D 82/00* (2006.01)
*F16B 23/00* (2006.01)

(52) U.S. Cl. ............................... 56/1; 411/399; 411/424; 56/295

(58) Field of Classification Search ................. 411/399, 411/424, 116, 129, 131, 132, 143, 166; 56/295, 56/1, 6, 10.1, 255; 403/11, 21, 22
See application file for complete search history.

(56) References Cited

U.S. PATENT DOCUMENTS 1,066,761 A * 7/1913 Semon .......................... 411/138
5,036,727 A * 8/1991 Engel ........................... 74/579 E
5,483,747 A * 1/1996 Thompson et al. ............. 30/254
5,492,446 A * 2/1996 Hawkins et al. ............... 415/160

FOREIGN PATENT DOCUMENTS

| CA | 2477180 | 2/2006 |
|----|---------|--------|
| CA | 2477180 A1 | 2/2006 |
| GB | 2300236 A | 10/1996 |

* cited by examiner

*Primary Examiner*—Gary Estremsky
(74) *Attorney, Agent, or Firm*—Dicke, Billig & Czaja, PLLC

(57) ABSTRACT

A blade bolt for attaching a blade to a rotating member of a rotary mower has a head at a lower end, a cylindrical shoulder portion extending from the head, a shank extending from the shoulder portion, the shank having a cross-section that is rounded and non-cylindrical, and a threaded portion extending from the shank. The shoulder portion extends laterally beyond at least a portion of the shank such that the shoulder portion bears against the rotating member when the shank is inserted into a mounting aperture defined by the mounting member that has a shape corresponding to the cross-section of the shank. The rounded and non-cylindrical shank prevents rotation of the bolt, and distributes stress forces across a wider area compared to the prior art.

7 Claims, 4 Drawing Sheets

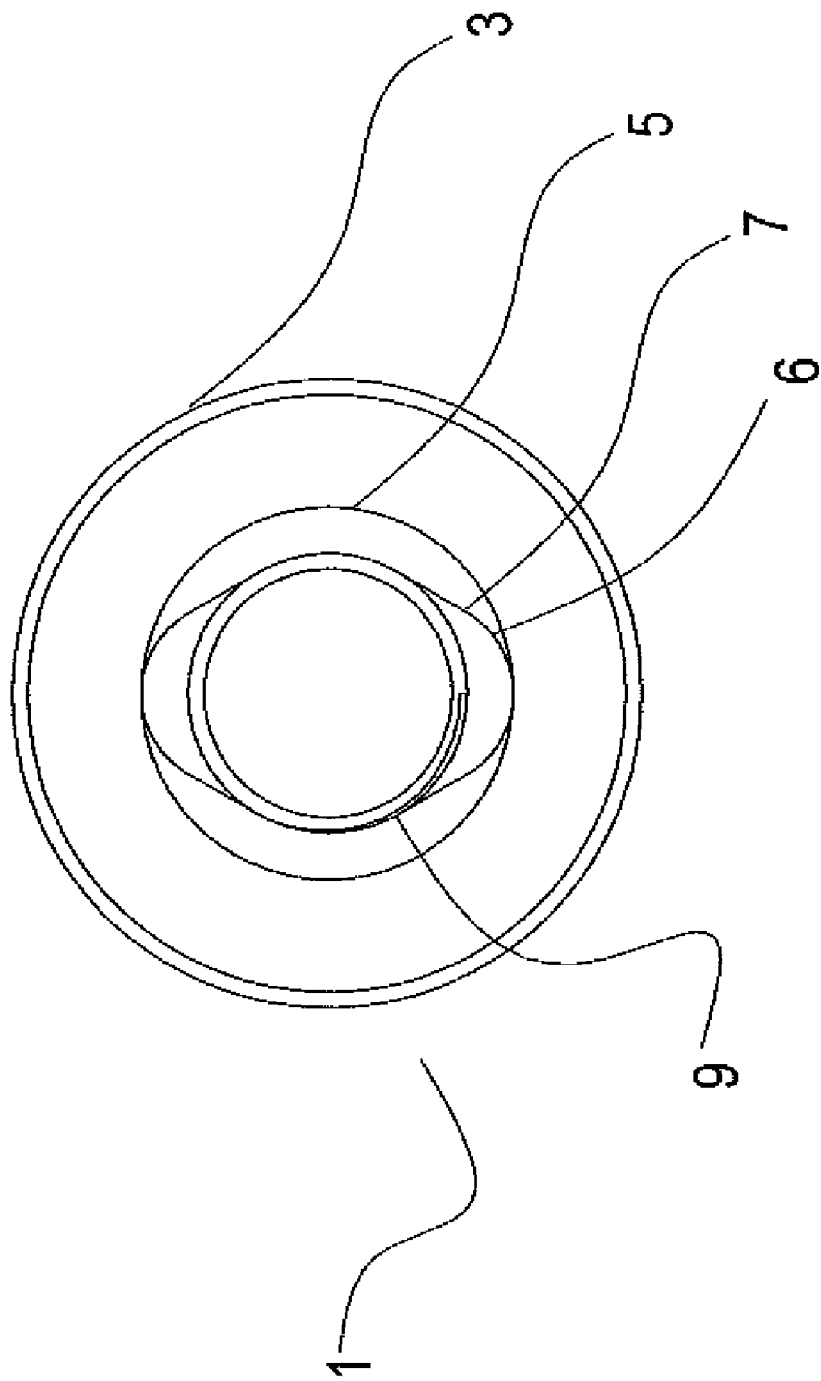

BOLT FOR ATTACHING A ROTARY MOWER BLADE

CROSS REFERENCE TO RELATED APPLICATION

This Utility Patent Application claims priority under 35 U.S.C. §119 to the Canadian Patent Application Serial No. CA 2615304, filed Dec. 19, 2007, which is herein incorporated by reference.

BACKGROUND

This invention is in the field of rotary mowers and in particular is concerned with attaching a blade to such a mower.

A typical rotary mower includes a rotating blade pan with a plurality of mower blades pivotally attached to the pan about substantially vertical pivot axes located near outer edges of the pan. The pan rotates at high speed, and centrifugal force causes the blades to extend radially from the rotational axis of the pan, and past the edge of the pan to cut vegetation. This design reduces damage when the blades contact obstructions such as rocks or the like, since when a blade contacts an obstruction it will pivot backwards about its pivot axis until the obstruction is cleared, and then move out again in response to the centrifugal force of the rotating pan. The pan itself is substantially smooth on the bottom, and so will simply ride over any obstruction.

The blades are typically attached to the pan with a blade bolt. As described in Canadian Patent Application Number 2,477,180 of Toth, these blade bolts typically have a head, then a shoulder portion that bears against the bottom of the pan, then a shank portion that extends through a hole in the pan, and finally a threaded portion on which a nut is threaded to tighten the bolt. The bolt is inserted through a hole in the blade, and then into the hole in the pan. The shoulder provides a spacer so that the blade is not pinched between the head and the pan, but rather can pivot freely on the shoulder. Corners on the head of the bolt catch on vegetation under the pan, and so the head is typically circular to reduce the amount of vegetation that catches on the bolt head.

Because the head is circular and difficult to grasp with a wrench, it is desirable to provide a means to prevent the bolt from rotating with respect to the pan. This facilitates tightening the nut when installing the blade, and reduces the risk that the bolt will turn in the nut and separate from the nut and fall off the pan. As described by Toth, the bolt thus typically includes a key, or is square, hexagonal, pentagonal, or the like, such that the shank engages a corresponding aperture in the pan. Toth also describes the stress concentrations at the corners of the shank, especially a square shank, which can cause the pan to crack and break. The corners of hexagonal bolts can strip. Toth proposes a pentagonal shank as a compromise between the square shank which is prone to cracking, and the hexagonal shank which is prone to stripping, however the pentagonal shank with its five corners is only a compromise, and is still subject to both the cracking and stripping problems.

SUMMARY

It is an object of the present invention to provide a bolt for attaching a rotary mower blade that overcomes problems in the prior art.

In a first embodiment the present invention provides a blade bolt for attaching a blade to a rotating member of a rotary mower. The bolt comprises a head at a lower end, a cylindrical shoulder portion extending from the head, a shank extending from the shoulder portion, the shank having a cross-section that is rounded and non-cylindrical, and a threaded portion extending from the shank. The shoulder portion extends laterally beyond at least a portion of the shank such that the shoulder portion bears against the rotating member when the shank is inserted into a mounting aperture defined by the mounting member.

In a second embodiment the present invention provides a rotary mower apparatus comprising a rotary mower deck adapted for movement along the ground, a blade pan rotatably mounted under the rotary mower deck, and a drive operative to rotate the pan about a substantially vertical pan axis. A plurality of pan apertures is defined about an outer portion of the pan. The pan apertures extend through the pan from a lower surface of the pan to an upper surface of the pan, and the pan apertures have a cross-section that is rounded and non-cylindrical. A plurality of mower blades is provided, each blade pivotally attached to the pan by a blade bolt extending through a blade aperture defined by the blade, and upward through a pan aperture such that each blade is located adjacent to the lower surface of the pan. Each blade bolt comprises a head on a lower end thereof, a cylindrical shoulder portion extending upward from the head through the blade aperture of an attached blade such that a top end of the shoulder portion bears against the lower surface of the pan, and such that the attached blade can pivot on the shoulder portion under the pan; a shank having a cross-section corresponding to the cross-section of the pan aperture such that the shank extends into the pan aperture and is prevented from rotating with respect to the pan aperture; and a threaded portion extending from the shank. A nut is threaded to the threaded portion of each blade bolt such that the nut bears against the upper surface of the pan.

The rounded non-cylindrical cross-section of the shank of the bolt, when inserted into the correspondingly shaped pan aperture, prevents rotation of the bolt in the pan aperture, and also distributes stress forces from the bolt to the pan through a wider surface area, compared to the corners in the prior art.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 3 is an end view of the embodiment of FIG. 1;

DETAILED DESCRIPTION

Figure 1:
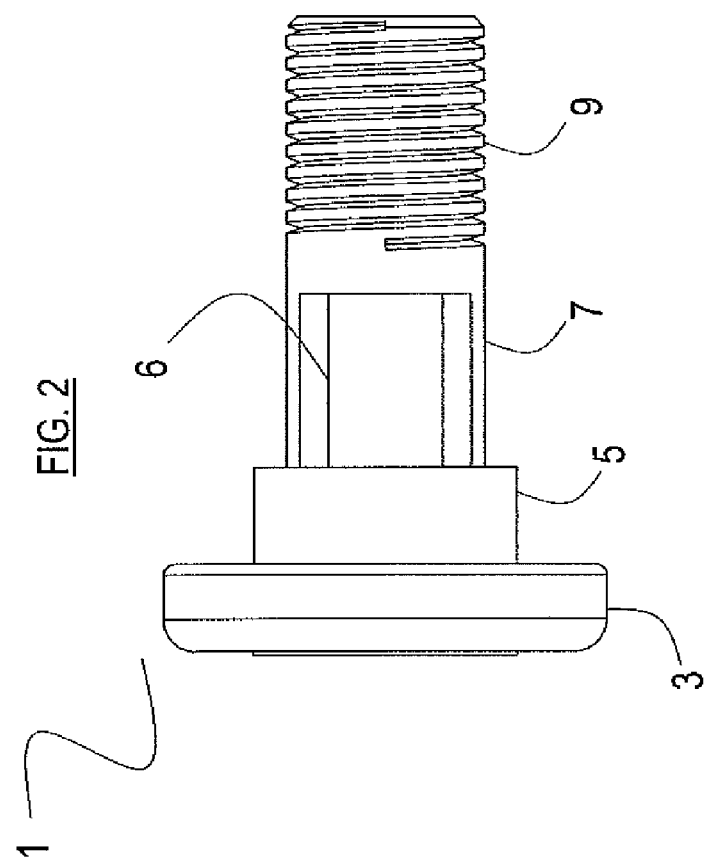
FIG. 1 is a perspective view of an embodiment of a blade bolt of the present invention.
Figure 2:
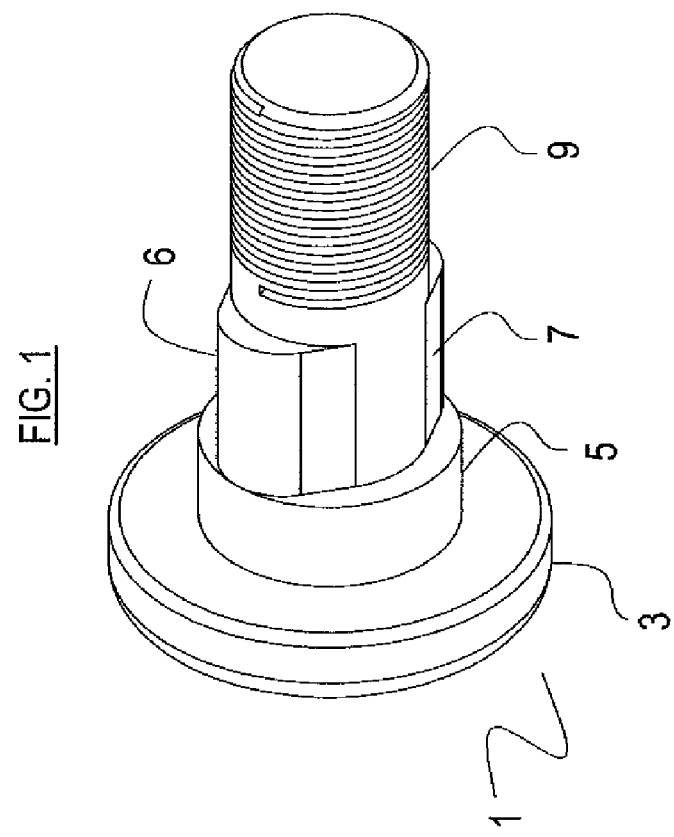
FIG. 2 is a side view of the embodiment of FIG. 1.

FIGS. 1-3 illustrate an embodiment of a blade bolt 1 of the invention for attaching a blade to a rotating member of a rotary mower. The bolt 1 comprises a head 3 at a lower end, a cylindrical shoulder portion 5 extending from the head 3, a shank 7 extending from the shoulder portion 5, and a threaded portion 9 extending from the shank 7 at an upper end.

The shank 7 has a cross-section that is rounded and non-cylindrical such that when inserted in an aperture with a corresponding cross-section, the shank 7 is prevented from rotating in the aperture. Because the shank 7 is rounded it has no sharp corners as in the blade bolts of the prior art. In the prior art, these sharp corners concentrated the stress in the bolts in small areas at the corners of the bolt shanks and the corresponding corners of mounting holes in the rotating member of the mower to which the blades were attached. With the shank 7 of the present invention, the corners are eliminated and so stress is spread out to larger surface areas of the bolt shanks and mounting holes.

The illustrated cross-section of the shank 7 in FIGS. 1-3 is oblong, with symmetrical lobes 6 extending from the cylindrical center portion which extends to form the threaded portion 9. The oblong provides the required resistance to rotation of the shank 7 in a mounting hole with the corresponding shape, and the rounded ends of the shank spread stress from the bolt to the aperture over a significantly increased area compared to a sharp corner.

Figure 7:
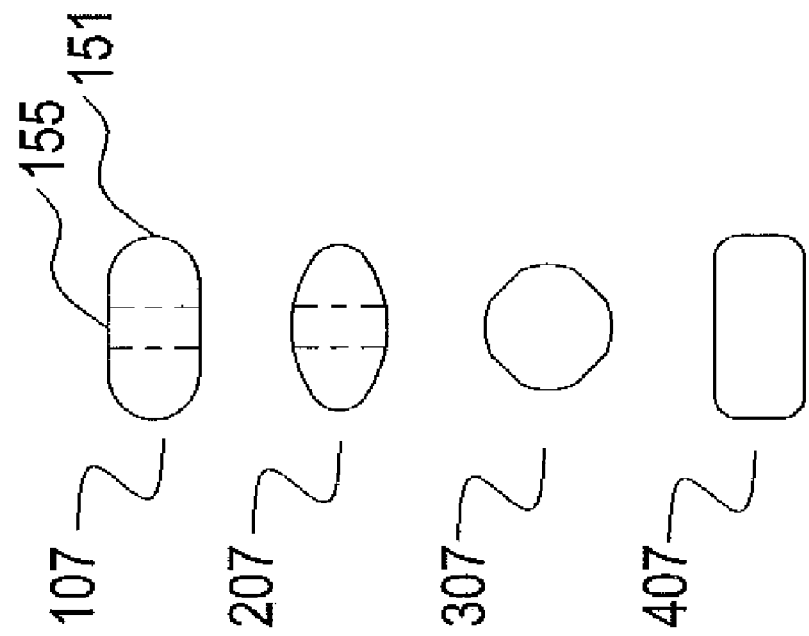
FIG. 7 shows alternate embodiments of the blade bolt of the invention with various shank configurations.

FIG. 7 illustrates some alternate examples of possible configurations of the bolt shank. Shank 107 includes rounded lobes 151 extending laterally in opposite directions from the central portion 155 of the shank 107. The lobes 151 are configured such that cross-section of the shank 107 is symmetrical, such that the loads and stresses on the bolt and mounting member are symmetrically distributed. Shank 207 has an elliptical cross-section. Shank 307 is essentially a circle with the sides cut off, forming a square with rounded corners. Similarly shank 407 is essentially a rectangle with rounded corners.

The shoulder portion 5 extends laterally beyond at least a portion of the shank 7, as seen in FIG. 3, such that the shoulder portion 5 bears against the rotating mounting member when the shank is inserted into a mounting aperture defined by the mounting member.

Figure 5:
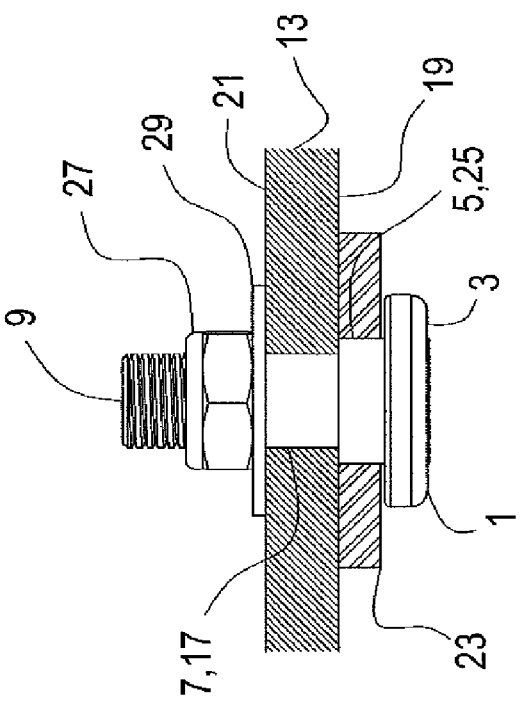
FIG. 5 is a schematic sectional view along line 5-5 in FIG. 4.
Figure 4:
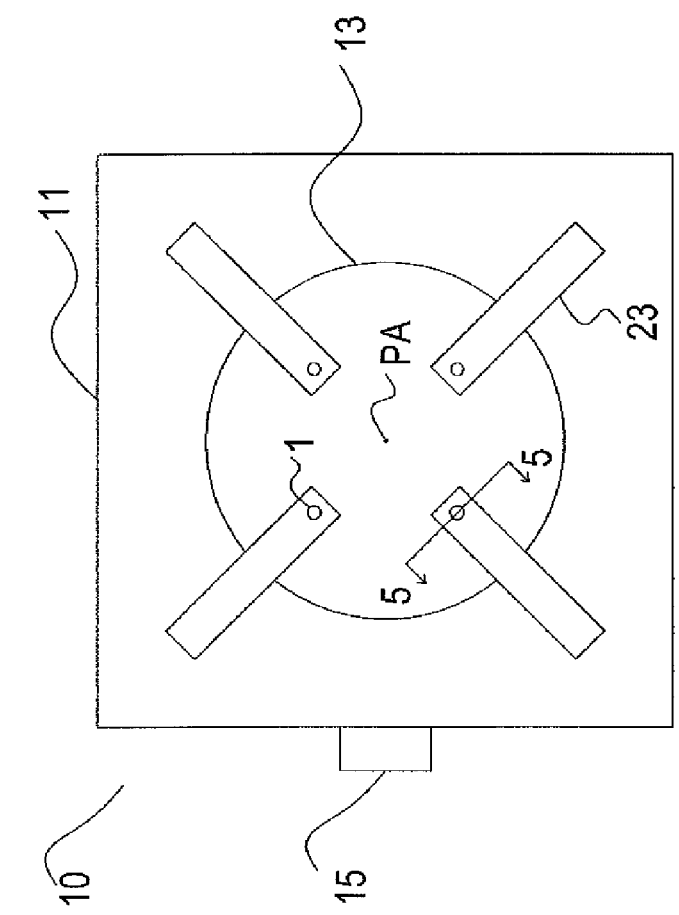
FIG. 4 is a bottom view of an embodiment of a rotary mower apparatus using the blade bolt of FIG. 1.
Figure 6:
FIG. 6 is a bottom view of the elliptical pan aperture used with the bolt of FIG. 1.

Thus a rotary mower apparatus 10 of the invention, as illustrated in FIGS. 4-6, comprises a rotary mower deck 11 adapted for movement along the ground by mounting on wheels or the arms of a towing vehicle. A blade pan 13 is rotatably mounted under the deck 11, and a drive 15 connected to a towing vehicle or motor is operative to rotate the pan 13 about a substantially vertical pan axis PA.

A plurality of pan apertures 17 are defined about an outer portion of the pan 13. The pan apertures 17 extend through the pan 13 from a lower surface 19 of the pan to an upper surface 21 of the pan. As illustrated in FIG. 6, the pan apertures 17 have a cross-section that is rounded and non-cylindrical oblong shape corresponding to the cross-section of the shank 7. In practice, the pan apertures 17 can conveniently be provided by bushings machined to the correct shape, and then welded into holes in the pan.

Mower blades 23 are pivotally attached to the pan 13 by blade bolts 1 extending through a circular blade aperture 25 defined in each blade 23, and upward through the pan apertures 17 such that each blade 23 is located adjacent to the lower surface 19 of the pan 13. As seen in FIG. 5, the head 3 on the bottom end of the bolt 1 supports the blade 23, and the cylindrical shoulder portion 5 of the bolt 1 extends upward from the head 3 through the blade aperture 25 of the attached blade 23 such that a top end of the shoulder portion 5 bears against the lower surface 19 of the pan 13. The shoulder portion 5 is somewhat longer than the thickness of the blade 23, such that the attached blade 23 can pivot freely on the shoulder portion 5 under the pan 23 between the head 3 of the bolt 1 and the lower surface of the pan 13.

The shank 7 of the bolt 1 has an oblong cross-section corresponding to the cross-section of the pan aperture 17 such that the shank 7 extends into the pan aperture 17 and is prevented from rotating with respect to the pan aperture 17. The threaded upper portion 9 of the bolt 1 extends above the upper surface 21 of the pan 13 and a nut 27 is threaded to the threaded portion 9 of the blade bolt 1 such that the nut 27, typically through a washer 29, bears against the upper surface 21 of the pan 13.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A rotary mower apparatus comprising a rotating member defining a mounting aperture having a cross-section substantially corresponding to the cross-section of a shank of a blade bolt, the blade bolt comprising:
    a head at a lower end;
    a cylindrical shoulder portion extending from the head;
    a shank extending from the shoulder portion, the shank having a cross-section that is rounded and non-cylindrical; and
    a threaded portion extending from the shank;
    wherein the shoulder portion extends laterally beyond at least a portion of the shank such that the shoulder portion bears against the rotating member when the shank is inserted into the mounting aperture;
wherein the shank extends into the mounting aperture such that the bolt is prevented from rotating in the mounting aperture.

2. A rotary mower apparatus comprising:
    a rotary mower deck adapted for movement along the ground;
    a blade pan rotatably mounted under the rotary mower deck, and a drive operative to rotate the pan about a substantially vertical pan axis;
    a plurality of pan apertures defined about an outer portion of the pan, the pan apertures extending through the pan from a lower surface of the pan to an upper surface of the pan, the pan apertures having a cross-section that is rounded and non-cylindrical;
    a plurality of mower blades, each blade pivotally attached to the pan by a blade bolt extending through a blade aperture defined by the blade, and upward through a pan aperture such that each blade is located adjacent to the lower surface of the pan;
    wherein each blade bolt comprises:
        a head on a lower end thereof;
        a cylindrical shoulder portion extending upward from the head through the blade aperture of an attached blade such that a top end of the shoulder portion bears against the lower surface of the pan, and such that the attached blade can pivot on the shoulder portion under the pan;
        a shank having a cross-section corresponding to the cross-section of the pan aperture such that the shank extends into the pan aperture and is prevented from rotating with respect to the pan aperture; and a threaded portion extending from the shank;

a nut threaded to the threaded portion of each blade bolt such that the nut bears against the upper surface of the pan.

3. The apparatus of claim 2 wherein the cross-section of the shank aperture and shank is oblong.

4. The apparatus of claim 2 wherein the shank includes at least one rounded lobe extending laterally from a central portion thereof.

5. The apparatus of claim 4 comprising first and second rounded lobes extending laterally in opposite directions from the central portion of the shank.

6. The apparatus of claim 5 wherein the first and second lobes are configured such that cross-section of the shank is symmetrical.

7. The apparatus of claim 4 wherein the cross-section of the shank is substantially elliptical.

* * * * *